H. MINTZ.
SAFE.
APPLICATION FILED JAN. 4, 1912.

1,026,630.

Patented May 14, 1912.

Witnesses:
Jas. E. Hutchinson
Geo. D. Riley

Inventor:
Harry Mintz,
By Macon Milans Attorneys

UNITED STATES PATENT OFFICE.

HARRY MINTZ, OF PASSAIC, NEW JERSEY.

SAFE.

1,026,630.  Specification of Letters Patent.  Patented May 14, 1912.

Application filed January 4, 1912. Serial No. 669,484.

*To all whom it may concern:*

Be it known that I, HARRY MINTZ, a citizen of the United States, residing at Passaic, in the county of Passaic and State of New Jersey, have invented certain new and useful Improvements in Safes, of which the following is a specification, reference being had therein to the accompanying drawing.

This invention relates to safes and has for its primary object the provision of improvements tending to preserve the same against serious damage by explosives while at the same time preserving the safe against damaging influences of fire and water.

Figure 1:
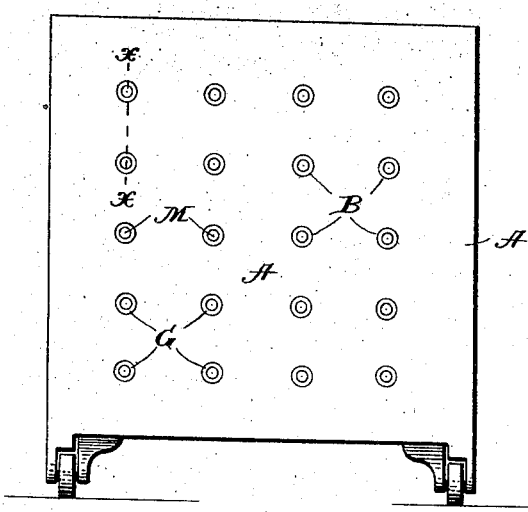

The preferred embodiment of the invention possessing the characteristics above noted, is illustrated in the accompanying drawings, forming part hereof, but, as will appeal to persons skilled in the art, the invention is capable of embodiments other than that specifically disclosed without departing from the spirit thereof. The details of the embodiment referred to will be apparent from the specific description hereinafter contained when read in connection with the drawings in which latter, Figure 1 is a face view of one of the side walls of a conventional type of safe; and Fig. 2 is a fragmentary sectional view therethrough as indicated by the line $x$—$x$.

Referring more specifically to the drawings, wherein like reference characters designate corresponding parts in the several views, A represents a steel side wall of the safe, the same being provided with a multitude of apertures B preferably of small diameter, say approximately one-half inch, conveniently passing entirely through the wall, each aperture terminating at the front in a countersunk portion C constituting a shoulder D. The bores constituted by the apertures are threaded at points adjoining the countersinks C for engagement by complementary exteriorly threaded portions of tubes G constituting holders for valves or plugs to be presently defined. This threaded connection is represented at E.

Figure 2:
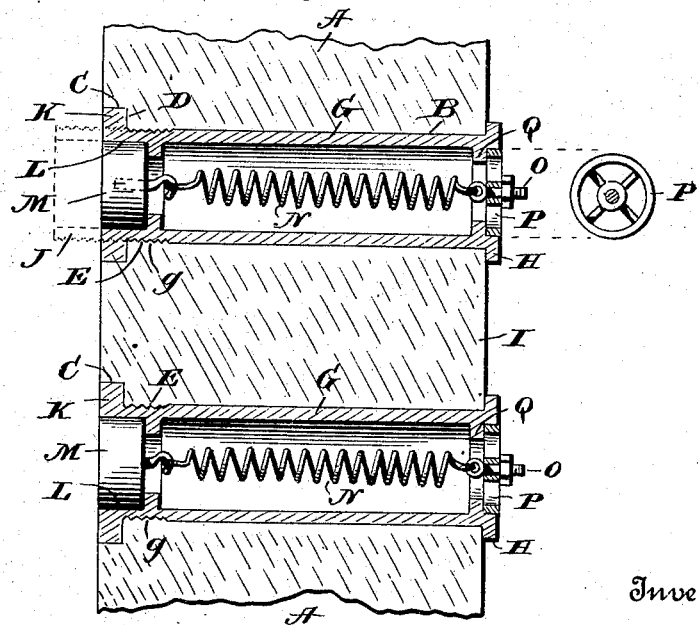

Each tube G has a flange H at its inner end adapted to abut the inner surface I of the wall A, it being observed that the tubes are introduced into the apertures B from inside the safe, the forward ends of the tubes initially projecting therethrough as shown in dotted lines J, Fig. 2. After the tubes are threaded into engagement with the threaded bores constituted by the apertures B, the end K thereof is upset, after the manner of a rivet into the countersink D, thus firmly fastening the tubes in place to constitute a permanent part of the wall A.

Near the forward end of each tube G is a valve seat L in which a valve or plug M is adapted to fit, such fit being preferably a machine fit to avoid the use of packing while at the same time affording a sealing engagement between the parts. Assisting in the retention of the valve or plug in place is a spring N passing through the tube G and adjustably connected through the medium of the threaded bolt O to a spider or screen P in turn abutting against a flange or other suitable stop Q. The normal tendency of the spring is to draw the valve or plug M and the spider or screen P toward each other and against their respective seats or stops L and Q.

When the parts are properly assembled the exposed surface of the wall A, offset end K of the tubes and ends of the valves of plugs M are planed down into flush condition and polished to practically eliminate any appearance of the use of or location of the valved vents or openings.

I have already referred to the close fitting engagement of the valves in their seats to prevent the admission of fire or water to the compartment or compartments within the safe, and it will be appreciated that should an attempt be made to blow open the safe through the medium of explosives, the gases will pass through the screens or spiders P and tubes G, thrusting the valves or plugs M outwardly from their pockets, and thereby opening the tubes to the exterior of the safe and permitting the gases to escape and relieving the pressure on the interior of the safe.

While I have shown the use of both the threaded engagement E, F and the upsetting of the ends K of the tubes, it is obvious that either one of these might be employed without the other as may be found expedient and in keeping with the conditions governing the use of the safe, etc.

I claim:—

1. A safe provided with a vent opening, a valve therein, a stop member, and a spring interposed between the stop member and the valve constituting the connection therebetween, said spring being located within the vent opening, substantially as described.

2. A safe provided with a vent opening, a valve therein, a stop member, and a spring in the vent opening connecting the valve and stop member, said stop member comprising a spider or screen permitting free passage of gases etc. to the inner surface of the valve.

3. A safe provided with a vent opening, a tube fixed therein, and a valve fitting said tube adapted to open to afford a passage through said tube, said tube having threaded engagement with the body of the safe.

4. A safe provided with a vent opening, a tube fixed therein, and a valve fitting said tube adapted to open to afford a passage through said tube, said tube having threaded engagement with the body of the safe and having its opposite ends offset to prevent removal of the tube.

5. A safe provided with a vent opening, a tube fixed therein, and a valve fitting said tube adapted to open to afford a passage through said tube, said tube being offset to engage the body of the safe.

6. A safe provided with a vent opening, a tube secured therein, a valve seat in said tube, a valve engaging said seat adapted to open to afford a passage through the tube, and means for maintaining the valve in place.

7. A safe provided with a vent opening, a tube secured therein, a valve seat in said tube, a valve engaging said seat, and means for maintaining the valve in place, said means comprising a spring engaging the valve and anchored in the tube.

8. A safe provided with a vent opening, a tube secured therein, a valve seat in said tube, a valve engaging said seat, and means for maintaining the valve in place, said means comprising a spring engaging the valve and anchored in the tube, the anchoring means comprising a screen or spider engaging the tube.

In testimony whereof I affix my signature in presence of two witnesses.

HARRY MINTZ.

Witnesses:
  Geo. D. Riley,
  Jos. H. Milans.

---

Copies of this patent may be obtained for five cents each, by addressing the "Commissioner of Patents, Washington, D. C."